Nov. 28, 1961     L. E. NAIL     3,010,293
GLASS FROSTER
Filed April 14, 1959     3 Sheets-Sheet 1
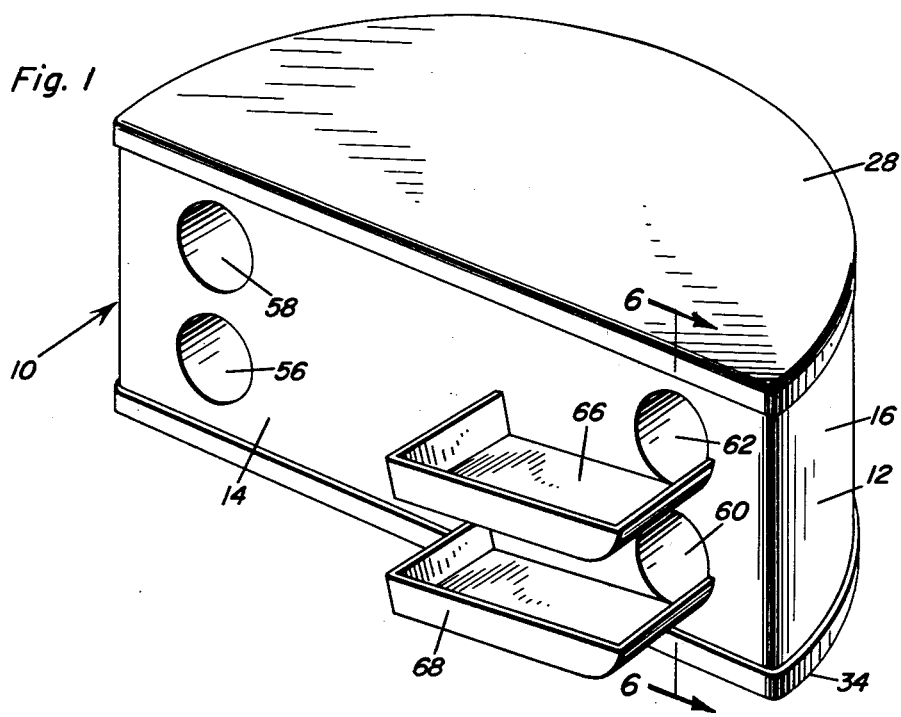
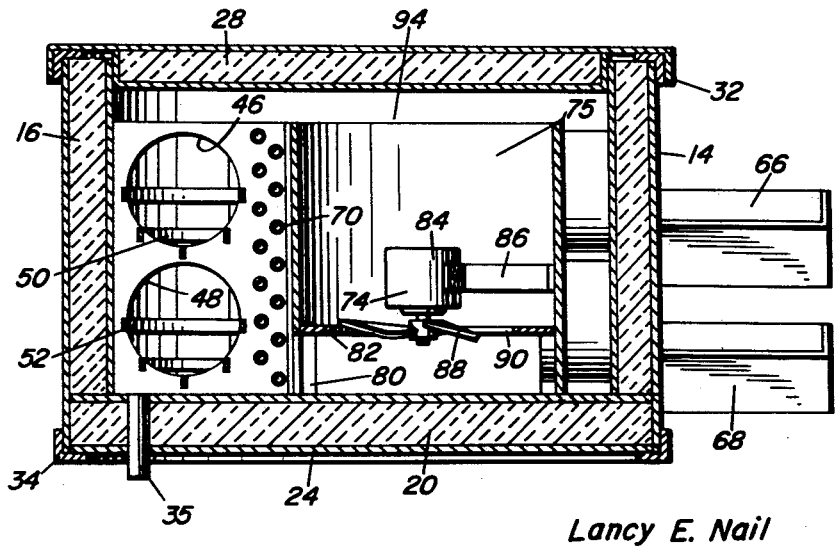
Lancy E. Nail
INVENTOR.

Nov. 28, 1961 L. E. NAIL 3,010,293
GLASS FROSTER

Filed April 14, 1959 3 Sheets-Sheet 2

Lancy E Nail
INVENTOR.

BY *Clarence A. O'Brien*
*and Harvey B. Jacobson*
Attorneys

Nov. 28, 1961  L. E. NAIL  3,010,293
GLASS FROSTER
Filed April 14, 1959  3 Sheets-Sheet 3
Fig. 5
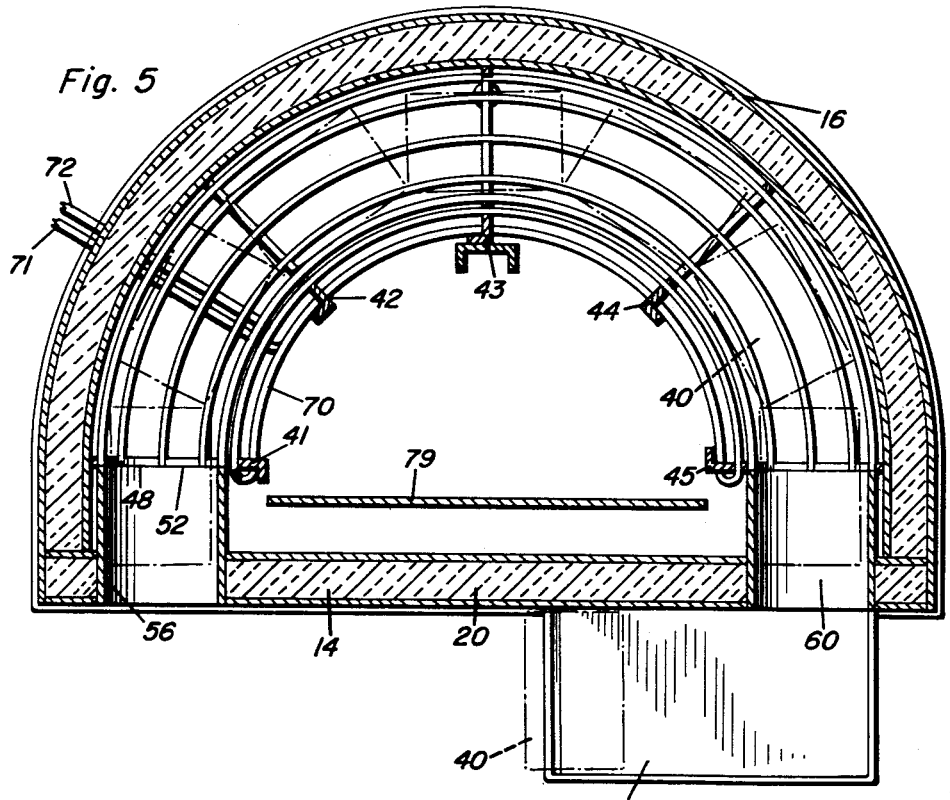
Fig. 6
Fig. 7
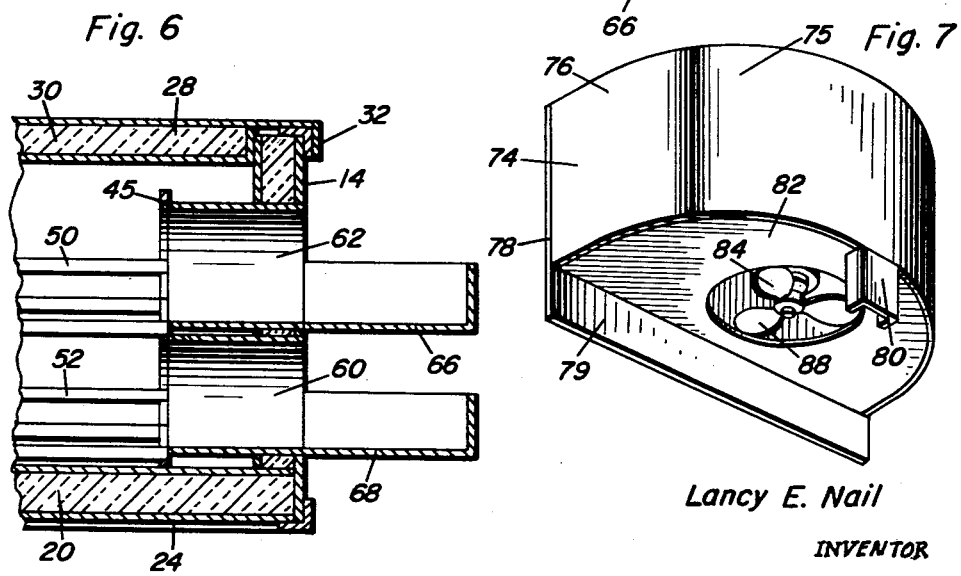
Lancy E. Nail
INVENTOR United States Patent Office 3,010,293
Patented Nov. 28, 1961

3,010,293
GLASS FROSTER
Lancy E. Nail, 302 S. Brooks St., Madison, Wis.
Filed Apr. 14, 1959, Ser. No. 806,308
1 Claim. (Cl. 62—382)

This invention relates to refrigeration equipment and more particularly to a device for frosting glasses.

An object of the invention is to provide an inexpensive, practical device for frosting glasses and for maintaining a supply of frosted glasses which are readily available for use without the necessity of opening doors, cabinets, refrigerators, etc.

A further object of the invention is to provide a glass froster consisting essentially of a refrigeration cooling coil specially arranged in a cabinet that has an inlet and an outlet, the cooling coil being located adjacent to one or more tracks on which the glasses are slid from the inlet to the outlet of the cabinet. Accordingly, when a glass is desired, a fresh glass is pushed into the inlet causing one of the cooled and frosted glasses to be discharged from the outlet. This is a time saving expedient so that the glasses are quickly obtainable by a bartender or any other person desiring to use frosted glasses for any type of beverage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a glass froster in accordance with the invention.

FIGURE 4 is a sectional view taken on the line 4—4 of FIGURE 3.

FIGURE 5 is a sectional view taken on the line 5—5 of FIGURE 3.

FIGURE 6 is a sectional view taken on the line 6—6 of FIGURE 1.

FIGURE 7 is a bottom perspective view of the glass froster air circulation unit.

Figure 2:
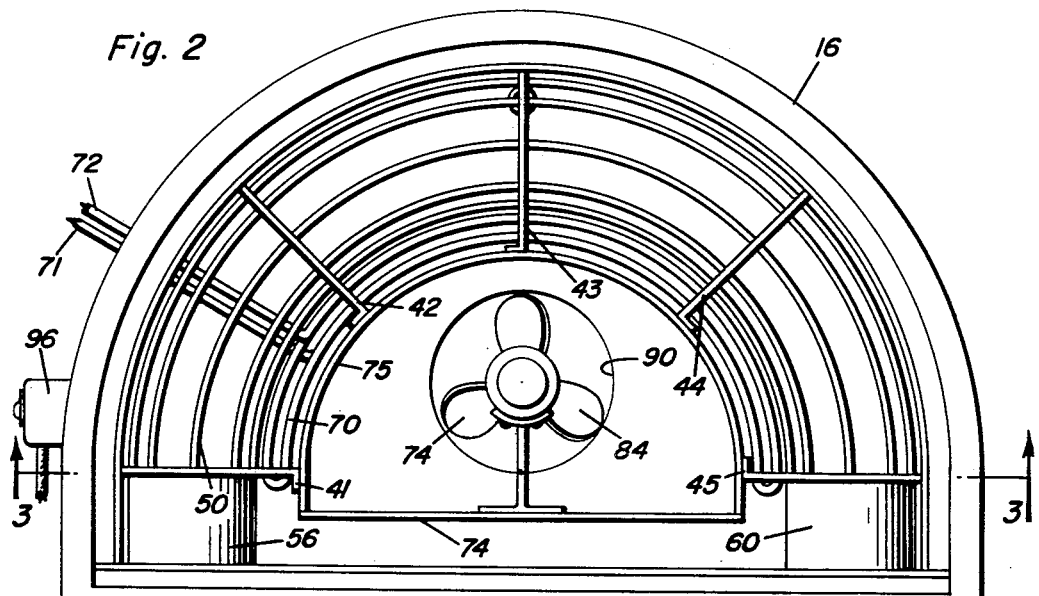
FIGURE 2 is a top view of the froster in FIGURE 1 with the cover removed.

In the accompanying drawings there is a glass froster 10 constructed in accordance with the invention. The glass froster is designed so that it may be stacked with other identically constructed frosters or so that it may be used as a single individual unit. Glass froster 10 is made of a housing 12 having a front wall 14 and a semi-cylindrical side wall 16. All walls are of double thickness with insulation 20, for instance cork or a synthetic substance of conventional insulation therebetween. There is a bottom wall 24 attached to the side wall 16 and front wall 14 and an open top section 26 covered by lid or closure 28. The lid or closure is insulated, as is the bottom wall 24. The lid has the insulated portion 30 thereof set in the opening 26 at the top of the housing, and a downwardly extending rim 32 engages the upper outer edge of the housing. The lower corner of the housing has a reinforcing angle 34 attached thereto, and drain 35 extends from housing 12.

Figure 3:
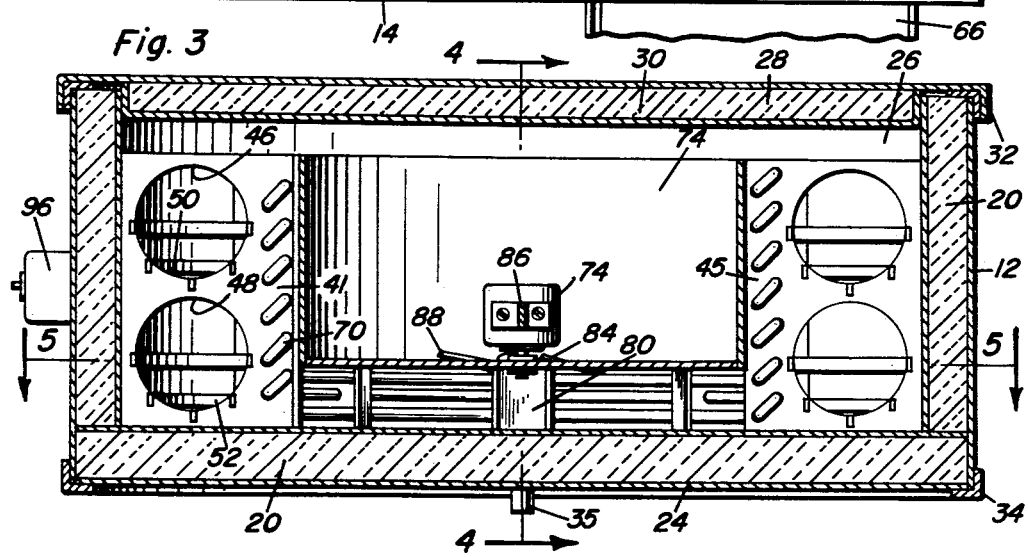
FIGURE 3 is a sectional view taken on the line 3—3 of FIGURE 2.

The internal construction of the housing cooperates with the shape of the housing for the handling of glasses 40. There are several upstanding, circumferentially spaced, radial plates or supports 41, 42, 43, 44 and 45, each of which is made of a flat plate and placed on a radius of the semi-cylindrical portion of the housing. Supports 41, 42, 43, 44 and 45 have upper and lower apertures 46 and 48 (FIGURES 3 and 4) functioning as glass passages, and there are upper and lower tracks 50 and 52, each made of an open framework, extending through the apertures 46 and 48. Typical tracks are composed of thin strips arranged so that the cross-sectional shape thereof is in the form of an upwardly opening semi-cylindrical cradle on which the glasses 40 are supported. There are glass inlet tubes 56 and 58 opening through the front 14 of the housing 12, and glass discharge tubes 60 and 62 also opening through wall 14 of housing 12. The glass inlet and discharge tubes are in registry with the ends of the tracks 50 and 52, and there are upwardly opening trays 66 and 68 attached to wall 14 at the outer ends of the glass discharge tubes 60 and 62 so as to recive the glasses therein.

Cooling coil 70 is in the form of a semi-cylinder, and the tubing thereof is attached to or passed through openings in the supports 41, 42, 43, 44 and 45. Cooling coil 70 is located on the inner circumference portion of tracks 50 and 52, and cooling coil lines 71 and 72 are connected to the ends of the cooling coils and pass through apertures in the housing to a refrigeration unit (not shown).

Air circulation unit 74 (FIGURE 7) is disposed within the semi-cylindrical cooling coil 70, and it is removable. The air circulation unit consists of a casing 75 having a cylindrical side wall 76 and a flat side wall 78 which is longer than the cylindrical side wall to form a flat leg 79. Another leg 80 is connected with the bottom 82 of the casing 75 and is located approximately at the center of cylindrical side wall 76. Air impeller 84 is mounted within casing 75, for instance by a mounting bracket 86 and consists of a conventional fan. The blade 88 of the fan is mounted for rotation within or in registry with aperture 90 in the bottom 82 of the casing so that air may be circulated over and around the tracks, the cooling coil and the majority of the interior cavity 94 of the glass froster 10.

The control for the fan is not shown, although this is to be conventional. The same holds true for the refrigeration unit. The control 96 is a conventional thermostatic control.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A drinking glass froster comprising a substantially semi-cylindrical heat-insulated housing including a bottom, a removable top and a flat front having transversely spaced glass receiving and discharging openings therein, a plurality of upstanding, circumferentially spaced plates mounted radially in the outer portion of the housing and having openings therein, a substantially semi-circular, horizontal track in the housing for slidably conveying the glasses between the first named openings, said track including spaced strips mounted on the plates and passing through the second named openings for conveying the glasses therethrough, a generally U-shaped, horizontal cooling coil mounted on the plates inwardly of and concentrically with the track, and a removable air circulating unit mounted in the central portion of the housing, said unit comprising a substantially semi-cylindrical casing insertable vertically in the housing on the inner edges of the plates, said casing including open upper and lower ends spaced vertically from the top and bottom of the housing, and a circulating fan mounted horizontally in the casing.

References Cited in the file of this patent

UNITED STATES PATENTS

| | | |
|---|---|---|
| 1,638,402 | Locker et al. | Aug. 9, 1927 |
| 2,739,455 | Idzi | Mar. 27, 1956 |
| 2,923,136 | Tiede | Feb. 2, 1960 |